(12) United States Patent
Asano et al.

(10) Patent No.: US 9,669,660 B2
(45) Date of Patent: Jun. 6, 2017

(54) PNEUMATIC TIRE WITH SPECIFIED TREAD THICKNESS DISTRIBUTION

(71) Applicant: SUMITOMO RUBBER INDUSTRIES, LTD., Kobe-shi (JP)

(72) Inventors: Kazuo Asano, Kobe (JP); Yasuhiro Kubota, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 357 days.

(21) Appl. No.: 14/225,791

(22) Filed: Mar. 26, 2014

(65) Prior Publication Data

US 2014/0290818 A1 Oct. 2, 2014

(30) Foreign Application Priority Data

Mar. 27, 2013 (JP) .................................. 2013-067060

(51) Int. Cl.
| | | |
|---|---|---|
| *B60C 11/00* | (2006.01) | |
| *B60C 3/00* | (2006.01) | |
| *B60C 3/04* | (2006.01) | |
| *B60C 9/02* | (2006.01) | |
| *B60C 11/03* | (2006.01) | |

(52) U.S. Cl.
CPC ................. *B60C 3/04* (2013.01); *B60C 3/00* (2013.01); *B60C 9/0292* (2013.04); *B60C 11/0008* (2013.04); *B60C 11/0332* (2013.04); *B60C 11/0083* (2013.04); *B60C 2011/0033* (2013.04)

(58) Field of Classification Search
CPC . B60C 11/0083; B60C 11/0008; B60C 11/00; B60C 2011/0033; B60C 3/00; B60C 3/04; B60C 9/0292
USPC .................................. 152/209.1, 209.14, 454
See application file for complete search history.

(56) References Cited

U.S. PATENT DOCUMENTS 5,565,047 A * 10/1996 Tanaka ....................... B60C 3/04
                                                                152/454
7,275,573 B2 * 10/2007 Nguyen .............. B60C 11/0083
                                                              152/209.14

FOREIGN PATENT DOCUMENTS

| JP | 2004-002622 A | 1/2004 |
|---|---|---|
| JP | 2004-010781 A | 1/2004 |

* cited by examiner

*Primary Examiner* — Adrienne C Johnstone
(74) *Attorney, Agent, or Firm* — Birch, Stewart, Kolasch & Birch, LLP

(57) ABSTRACT

When a pneumatic tire is in a reference state of being fitted with a rim that is one inch larger than a regular rim in width, of holding 15 kPa internal pressure, and of being under no load, then a tread thickness distribution curve represented by $f(y)=1-t(y)/t(0)$ is 0.01 to 0.03 when $y=0.3$; 0.03 to 0.06 when $y=0.4$; and 0.06 to 0.10 when $y=0.5$, where y denotes a ratio of a distance in an axial direction from an equator surface relative to a distance L in the axial direction between the equator surface and a maximum width position of a carcass, and $t(y)$ denotes a tread thickness corresponding to a distance in a radial direction between an outer surface of the carcass and an outer surface of a tread at an axial direction position corresponding to y.

2 Claims, 8 Drawing Sheets

(Comparative example 1)

(Comparative example 2)

(Example 1)

(Example 2)

(Example 2)

(Example 4)

(Example 5)

PNEUMATIC TIRE WITH SPECIFIED TREAD THICKNESS DISTRIBUTION

BACKGROUND OF THE INVENTION

Field of the Invention

The present invention relates to a pneumatic tire.

Discussion of the Background

Rolling resistance of tires is mainly caused by energy loss involved in cyclic straining of rubber during tire running. A conventional attempt to alleviate rolling resistance is to use rubbers of low levels of energy loss (that is, with smaller tan δ) for the tread rubber, which undergoes a large amount of straining during tire running and a large amount of rubber consumption. However, the use of rubbers of low levels of energy loss alleviates rolling resistance at the compromise of grip performance (in particular, wet grip performance), and wear resistance may also deteriorate.

As disclosed in Japanese Unexamined Patent Application Publication Nos. 2004-010781 and 2004-002622, studies are underway to find a tread rubber composition that alleviates rolling resistance while improving wear resistance. However, the rubber composition approach alone makes a limited contribution to improved wear resistance and low rolling resistance. Thus, there is a strong demand for another approach, instead of the rubber composition approach, to improved wear resistance and low rolling resistance.

It is an object of the present invention to provide a pneumatic tire with alleviated rolling resistance and alleviated uneven wear at the shoulder of the pneumatic tire.

SUMMARY OF THE INVENTION

According to one aspect of the present invention, a pneumatic tire includes a tread, a sidewall, a bead, and a carcass. The sidewall is coupled to the tread. The bead is coupled to the sidewall and includes a bead core. The carcass extends between the tread and the bead core through the sidewall. When the pneumatic tire is in a reference state in which the pneumatic tire is fitted with a rim having a width that is one inch larger than a width of a regular rim, in which the pneumatic tire is holding 15 kPa internal pressure, and in which the pneumatic tire is under no load, then a tread thickness distribution curve f(y) represented by a following Formula (1)

$$f(y)=1-t(y)/t(0) \quad (1)$$

is 0.01 to 0.03 when y=0.3;
0.03 to 0.06 when y=0.4; and
0.06 to 0.10 when y=0.5, where y denotes a ratio of a distance in an axial direction of the pneumatic tire from an equator surface of the pneumatic tire relative to a distance L in the axial direction of the pneumatic tire between the equator surface of the pneumatic tire and a maximum width position of the carcass, and t(y) denotes a tread thickness corresponding to a distance in a radial direction of the pneumatic tire between an outer surface of the carcass and an outer surface of the tread at a position Py in the axial direction of the pneumatic tire corresponding to y.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

In this embodiment, during vulcanization in forming the tire, the bead width of the tire in the vulcanization mold (that is, the clip width of the mold) is set at approximately one inch larger than the width of a regular rim, which is to be applied to the tire. A reason is that making the clip width larger than the width of the regular rim eliminates or minimizes the gap between the rim flange and the tire at the time of rim fitting. This, in turn, facilitates introduction of air and fitting of the tire with the rim. Another reason is that making the clip width larger than the width of the regular rim increases bead rigidity as a result of bead deformation involved in the rim fitting. This, in turn, increases operating stability. Internal pressure 15 kPa is an internal pressure that stabilizes the tire shape without causing swelling deformation of the tire. Thus, when the tire is in the "reference state in which the pneumatic tire is fitted with a rim having a width that is one inch larger than a width of a regular rim, in which the pneumatic tire is holding 15 kPa internal pressure, and in which the pneumatic tire is under no load", the tire has approximately the same shape as the shape of the tire in its vulcanized state in the mold. That is, the reference state is for the purpose of reproducing the shape of the tire as it has in the mold.

In this specification, the dimensions of the parts of the tire will be denoted by values specified in the reference state, unless otherwise stated.

The "regular rim" refers to a rim specified on a tire basis in the standard system including the standards on which the ti re i s based. For example, the regular rim corresponds to the standard rim specified in JATMA, to the "Design Rim" specified in TRA, and the "Measuring Rim" specified in ETRTO.

Rolling resistance is mainly caused by energy loss involved in cyclic straining of the tread member during tire running. It is therefore possible to alleviate rolling resistance by reducing strain energy at the tread member. Uneven wear can be evaluated using its wear energy distribution at the ground contact during tire running. When the wear energy is uniform at the ground contact, no uneven wear occurs. The wear energy can be represented by "ground pressure"× "slippage". In view of this, it is possible to make the wear energy uniform and minimize uneven wear by making the ground pressure and slippage uniform on the ground contact plane. Making the ground pressure and slippage uniform also reduces the strain energy at the tread member and alleviates rolling resistance.

In view of this, this embodiment specifies the tread thickness distribution curve f(y) to make the ground contact shape appropriate and make the ground pressure uniform. With the ground pressure and slippage made uniform, the rolling resistance and uneven wear at the shoulder are alleviated.

Figure 1:
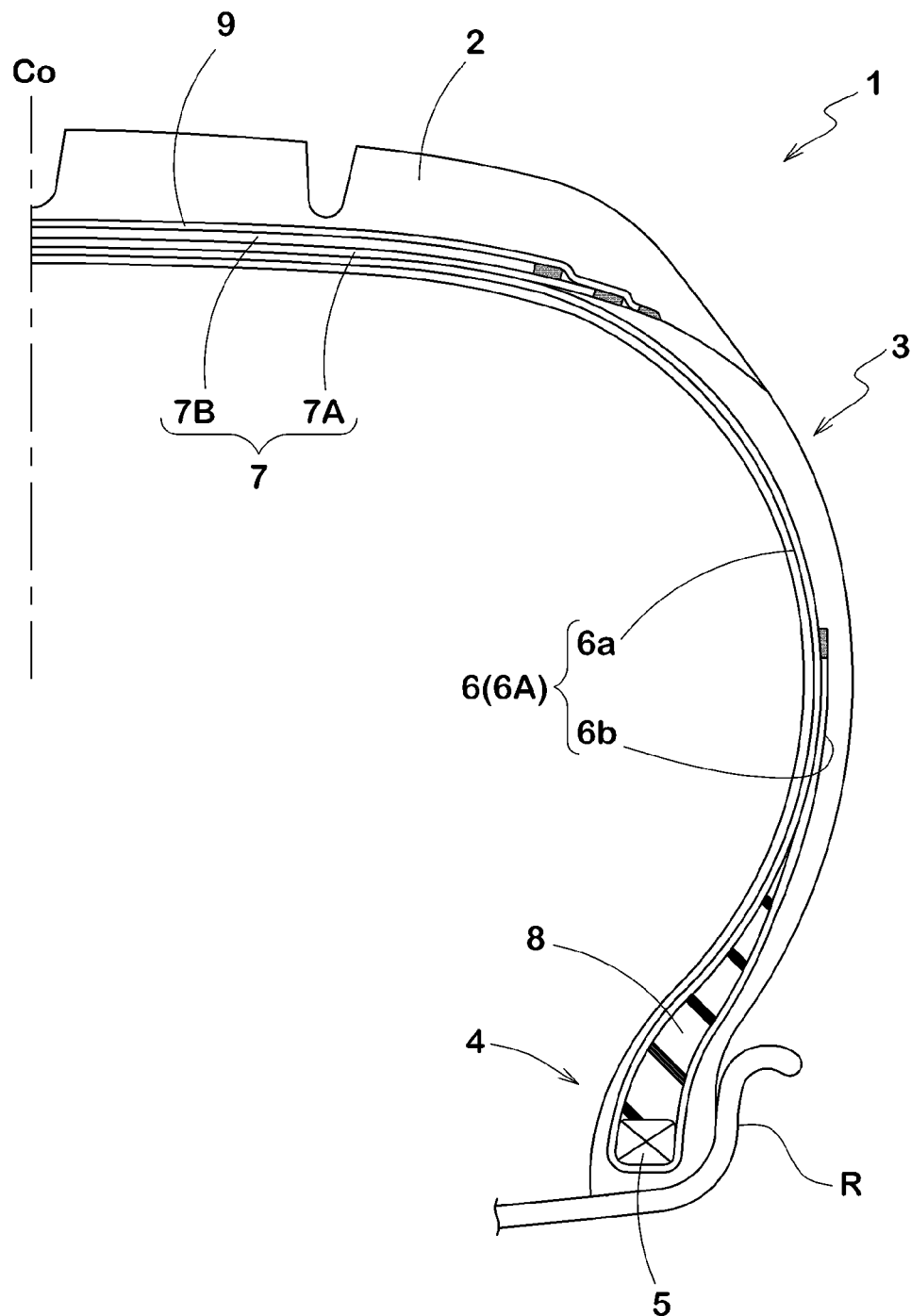
FIG. 1 is a cross-sectional view of a pneumatic tire according to an embodiment.

This embodiment will be described in detail below. As shown in FIG. 1, a pneumatic tire 1 according to this embodiment includes a tread 2, sidewalls 3, beads 4, and a carcass 6. The sidewalls 3 are coupled to the tread 2. The beads 4 are coupled to the sidewalls 3, and each of the beads 4 has a bead core 5. The carcass 6 extends from the tread 2 to the bead cores 5 through the sidewalls 3. In this embodiment, the pneumatic tire 1 is a radial tire for use in passenger cars.

The carcass 6 is made up of at least one carcass ply 6A. The carcass ply 6A is made of carcass cords aligned at an exemplary angle of from 75 degrees to 90 degrees relative to an equator surface Co of the pneumatic tire 1. In this embodiment, the carcass 6 is made up of a single carcass ply 6A. The carcass ply 6A includes a toroid-shaped ply main body 6a and ply turn-up portions 6b. The ply main body 6a extends between the bead cores 5. The ply turn-up portions 6b are disposed at both ends of the ply main body 6a and turn up around the bead cores 5 in an axially outward direction of the pneumatic tire 1. Between the ply main body 6a and each ply turn-up portion 6b, a bead apex rubber 8 is disposed. The bead apex rubber 8 is for the purpose of bead reinforcement and extends in a tapered manner in a radially outward direction of the pneumatic tire 1 from the bead core 5.

In the tread 2, a belt layer 7 is disposed. The belt layer 7 is over the carcass 6 in the radially outward direction of the pneumatic tire 1. The belt layer 7 is made up of at least two belt plies 7A and 7B. Each of the belt plies 7A and 7B is made of belt codes aligned at an exemplary angle of from 10 degrees to 35 degrees relative to the tire's equator surface Co. In this embodiment, the belt layer 7 is made up of two belt plies 7A and 7B. The belt codes of the belt ply 7A cross the belt codes of the belt ply 7B. This increases belt rigidity and provides a hoop effect on the tread 2, resulting in a firm reinforcement.

In this embodiment, a band layer 9 is disposed over the belt layer 7 in the radially outward direction of the pneumatic tire 1. The band layer 9 is for the purpose of increasing high-speed durability, and made up of band cords spirally wound at an angle equal to or less than five degrees relative to the tire's equator surface Co. The band layer 9 may be conveniently selected from, for example: a band layer made up of a pair of right-left edge band plies that cover only the outer end of the belt layer 7 in the tire's axial direction; and a band layer made up of a full band ply that covers approximately the entire area of the belt layer 7. In this embodiment, the band layer 9 is made up of a single full band ply.

Also in this embodiment, when the pneumatic tire 1 is in a reference state in which the pneumatic tire 1 is fitted with a rim R having a width that is one inch larger than the width of a regular rim, in which the pneumatic tire 1 is holding 15 kPa internal pressure, and in which the pneumatic tire 1 is under no load, then a tread thickness distribution curve f(y) represented by the following Formula (1) is specified as follows.

$$f(y)=1-t(y)/t(0) \qquad (1)$$

is 0.01 to 0.03 when y=0.3;
0.03 to 0.06 when y=0.4; and
0.06 to 0.10 when y=0.5.

Figure 2:
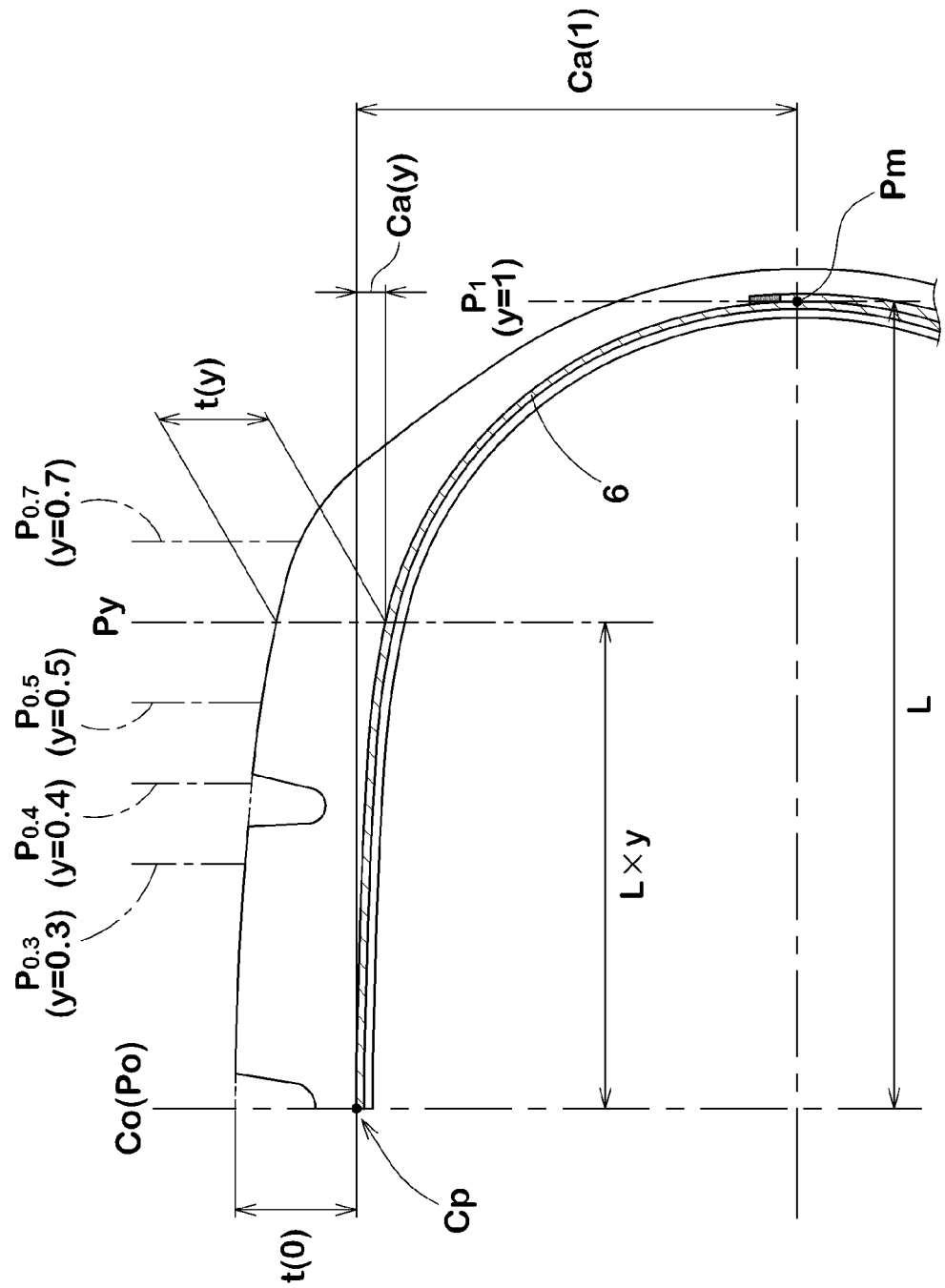
FIG. 2 is a cross-sectional view of the pneumatic tire, illustrating tread thickness t(y) and carcass camber Ca(y)

As schematically shown in FIG. 2, t(y) refers to a tread thickness. The tread thickness is a distance in the tire's radial direction between the outer surface of the carcass 6 and the outer surface of the tread 2 at a position $P_y$ in the tire's axial direction. The position $P_y$ in the tire's axial direction is defined as follows. The distance in the tire's axial direction between the tire's equator surface Co and a maximum width position $P_m$ of the carcass 6 is assumed L. A position in the tire's axial direction is defined as $P_y$ when the position is where the ratio of the distance in the tire's axial direction from the tire's equator surface Co relative to the distance L in the tire's axial direction is y. For example, $P_{0.4}$ is a position in the tire's axial direction where the distance in the tire's axial direction from the tire's equator surface Co is 0.4 times the distance L. Contrarily, the distance in the tire's axial direction from the tire's equator surface Co at the position $P_y$ in the tire's axial direction is represented by a product of L and y, (L×y). The maximum width position Pm of the carcass 6 is defined as a position where the outer surface of the ply main body 6a of the carcass 6 protrudes farthest outward in the tire's axial direction.

The tread thickness distribution curve f(y) refers to a rate of change in the tread thickness t(y) at each position $P_y$ in the tire's axial direction relative to a tread thickness t(0), which is at a position at the tire's equator surface Co (this position corresponds to the tire's axial direction position $P_0$). The values of the tread thickness distribution curve f(y) at y=0.3, y=0.4, and y=0.5 are specified within the above-described ranges. This makes the ground contact shape appropriate and makes the ground pressure uniform. With the ground pressure and slippage made uniform, the rolling resistance and uneven wear at the shoulder are alleviated.

Figure 3:
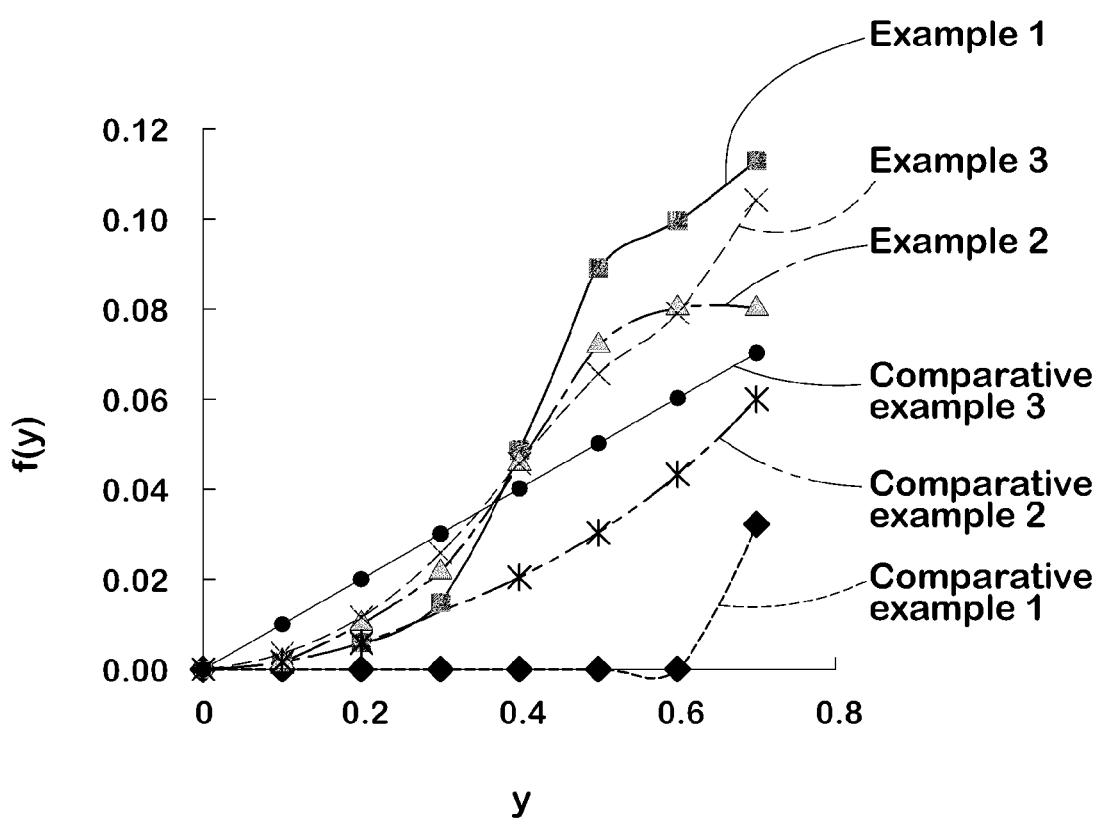
FIG. 3 is a graph of tread thickness distribution curves f(y) respectively according to examples 1 to 3 and comparative examples 1 to 3 listed in Tables 1-1 to 1-3.

FIG. 3 shows tread thickness distribution curves f(y) of tires according to examples 1 to 3 and tires according to comparative examples 1 to 3, which are listed in Tables 1-1 to 1-3, described later FIGS. 4A to 4D show ground plane shapes of the tires respectively according to examples 1 and 2 and comparative examples 1 and 2. In each ground plane shape, the ground pressure is higher where the color is darker.

Figure 4A:
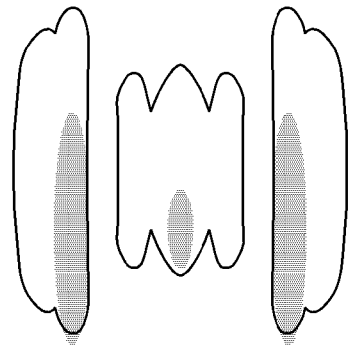
FIGS. 4A to 4D are plan views of ground plane shapes respectively according to examples 1 and 2 and comparative examples 1 and 2.

At the tire's axial direction position $P_{0.4}$, at which y=0.4, the ground contact length is greater and the ground pressure is higher in general. This is because under load, bending deformation occurs in the vicinity of the ground contact edge, and the tread rubber at the tire's axial direction position $P_{0.4}$ undergoes compression from the tire's circumferential direction and axial direction, that is, the tread rubber is concentrated at the tire's axial direction position $P_{0.4}$. When the ground contact length is greater and the ground pressure is higher, the shoulder of the pneumatic tire 1 is at a disadvantage in terms of wear and rolling resistance at the time of cornering. In particular, as in comparative example 1, when the tread thickness t(y) is uniformly distributed in the tire's axial direction, that is, when the tread thickness distribution curve f(y) forms a horizontal line at f(y)≈0, the ground contact length of the shoulder becomes excessively large and the ground pressure becomes higher, as shown in FIG. 4A.

A way to alleviate this tendency is to make f(y) a curve that increases as y increases.

Figure 4B:
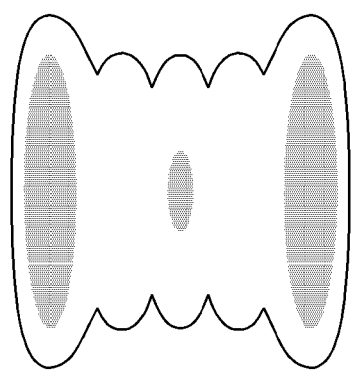
Figure 4C:
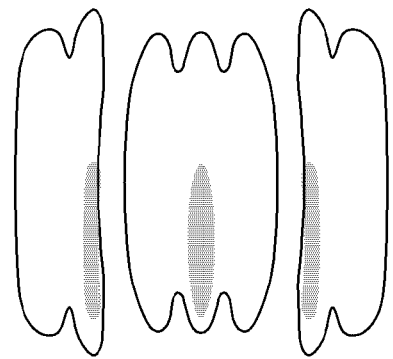
Figure 4D:
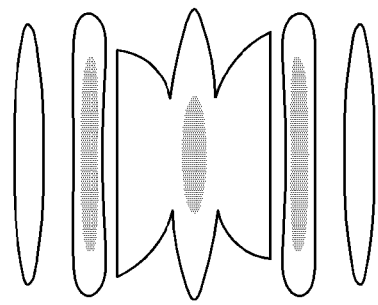

However, as in comparative example 2, when the value of f(y) at y=0.4 is smaller than 0.03, the tread thickness t(0.4), which is at the tire's axial direction position $P_{0.4}$, is still large enough relative to the tread thickness $t(0)$ at the tire's equator surface Co. Additionally, the external compressive force in the tire's axial direction makes the tread rubber thicker. As a result, the ground contact length and ground pressure at the shoulder is still higher as shown in FIG. 4B, and the shoulder is still insufficient in alleviation of wear and rolling resistance at the time of cornering.

Contrarily, when the value of f(y) at y=0.4 is higher than 0.06, the ground contact length on the side of the tire's equator surface is excessively higher, and the ground contact length on the side of the shoulder is excessively shorter. As a result, the slippage at the shoulder increases at the time of free rolling, making uneven wear more likely to occur at the shoulder.

When the value of f(y) at y=0.4 is in the range of from 0.03 to 0.06, the ground pressure distribution is not uniform; specifically, when the value of f(y) at y=0.3 is smaller than 0.01, the tread thickness t(y) on the side of the tire's equator surface is excessively higher, while when the value of f(y) at y=0.3 is higher than 0.03, the tread thickness t(y) on the side of the tire's equator surface Co is excessively smaller. When the value of f(y) at y=0.5 is smaller than 0.06, the tread thickness t(y) on the side of the shoulder is excessively higher, while when the value of f(y) at y=0.5 is higher than 0.10, the tread thickness t(y) on the side of the shoulder is excessively smaller. Thus, the ground pressure distribution is not uniform. This results in insufficiency in providing the effect of alleviating wear and rolling resistance at the shoulder.

Figure 5:
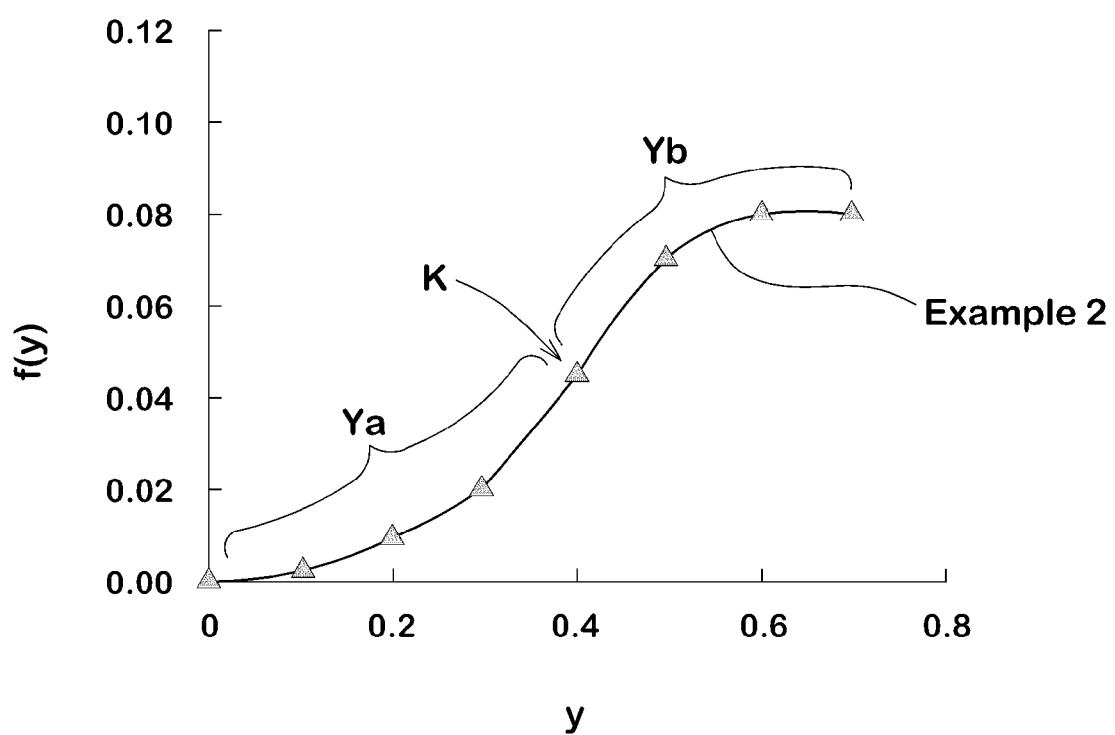
FIG. 5 is a graph of an enlarged tread thickness distribution curve f(y) according to example 2.

In view of this, it is necessary to specify the values of the tread thickness distribution curve f(y) at y=0.3, y=0.4, and y=0.5 within the above-described ranges. FIG. 5 shows a tread thickness distribution curve f(y) according to example 2 as representing a preferable f(y). Specifically, the tread thickness distribution curve f(y) preferably forms an s-shaped curve including a change rate increase region Ya and a change rate decrease region Yb. More preferably, an inflection point K between the change rate increase region Ya and the change rate decrease region Yb is in the range of from y=0.3 to y=0.5, further preferably y=0.35 to y=0.45. The change rate increase region Ya refers to a region in which the change rate of f(y), such as the inclination of a tangent on f(y), increases as y increases, forming a concave circular arc curve. The change rate decrease region Yb refers to a region in which the change rate of f(y) decreases as y increases, forming a convex circular arc curve.

Figure 6:
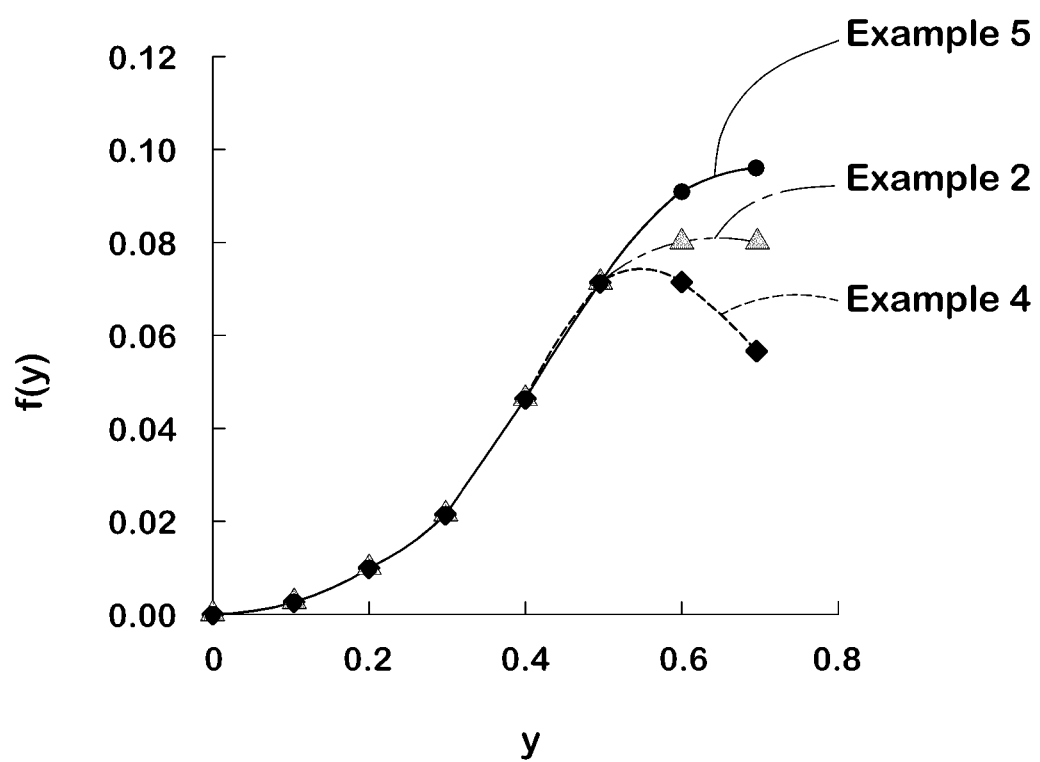
FIG. 6 is a graph of tread thickness distribution curves f(y) respectively according to examples 2, 4, and 5 listed in Tables 1-1 to 1-3.
Figure 7A:
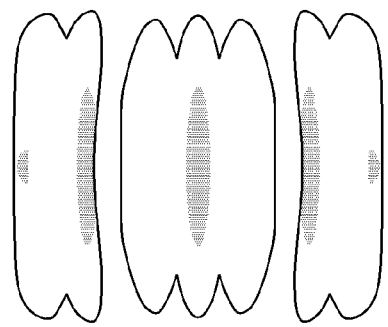
FIGS. 7A to 7C are plan views of ground plane shapes respectively according to examples 2, 4, and 5.
Figure 7B:
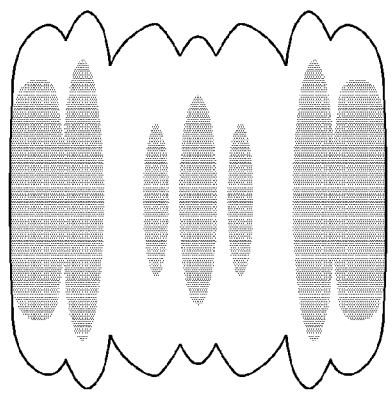
Figure 7C:
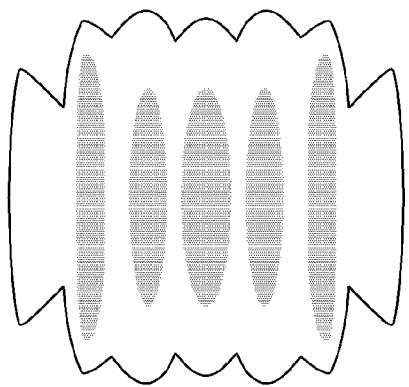

Next, in order to make the ground contact shape appropriate and make the ground pressure uniform, the difference between tread thickness distribution curves f(y) at y=0.5 and y=0.7, that is, (f(0.7)−f(0.5)), is preferably in the range of from −0.02 to 0.02, as shown in FIG. 6. FIG. 6 shows tread thickness distribution curves f(y) of the tires according to examples 2, 4, and 5 listed in Tables 1-1 to 1-3, described later. FIGS. 7A to 7C show ground contact plane shapes of the tires respectively according to examples 2, 4, and 5. When the difference (f(0.7)−f(0.5)) is higher than 0.02, the ground pressure on the side of the tire's equator surface Co is higher than the ground pressure on the side of the shoulder, as in example 5. When the difference (f(0.7)−f(0.5)) is smaller than −0.02, the ground pressure is higher on the side of the shoulder, as in example 4.

In the pneumatic tire 1, it is also necessary to make the carcass profile appropriate. In order to make the carcass profile appropriate, a ratio Ca(0.7)/Ca(1) is preferably in the range of from 0.100 to 0.145. The ratio Ca(0.7)/Ca(1) is a ratio between a carcass camber Ca(0.7), which is at the tire's axial direction position $P_{0.7}$, and a carcass camber Ca(1), which is at the tire's axial direction position $P_1$.

As shown in FIG. 2, the carcass camber Ca(y) refers to a distance in the tire's radial direction between a carcass equator point Cp and the outer surface of the carcass 6 at the position $P_y$ in the tire's axial direction. The carcass equator point Cp refers to a point of intersection between the outer surface of the carcass 6 and the tire's equator surface Co.

When the carcass camber ratio Ca(0.7)/Ca(1) is smaller than 0.100, the carcass profile becomes flat. This increases the ground pressure at the shoulder and puts the shoulder at a disadvantage in terms of uneven wear at the time of cornering. Contrarily, when the ratio Ca(0.7)/Ca(1) is higher than 0.145, the entire carcass profile and the ground contact shape become rounder. This makes the behavior of the tread during tire running rough and makes the rolling resistance worse. Additionally, the difference in outer diameter between the tire's equator surface Co and the shoulder increases, making the shoulder slippery at the time of free rolling and making uneven wear more likely to occur on the shoulder.

EXAMPLES

Figure 8A:
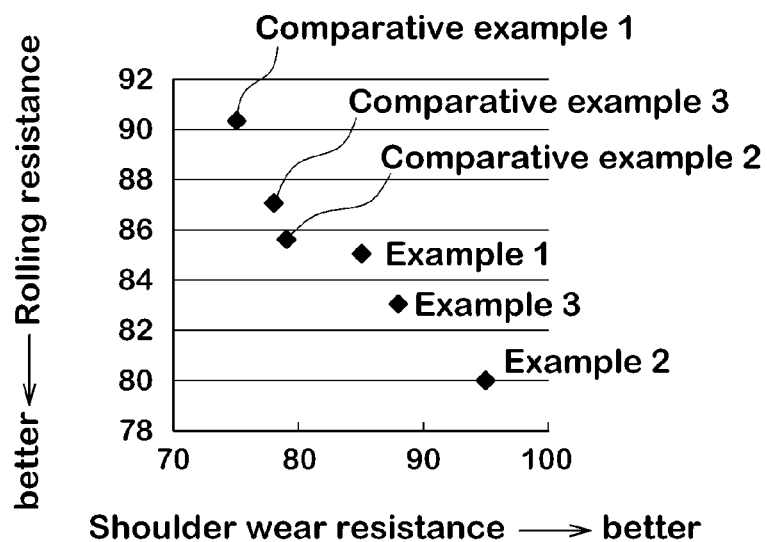
FIGS. 8A to 8C are graphs of rolling resistance and shoulder wear resistance according to the examples and the comparative examples listed in Tables 1-1 to 1-3.
Figure 8B:
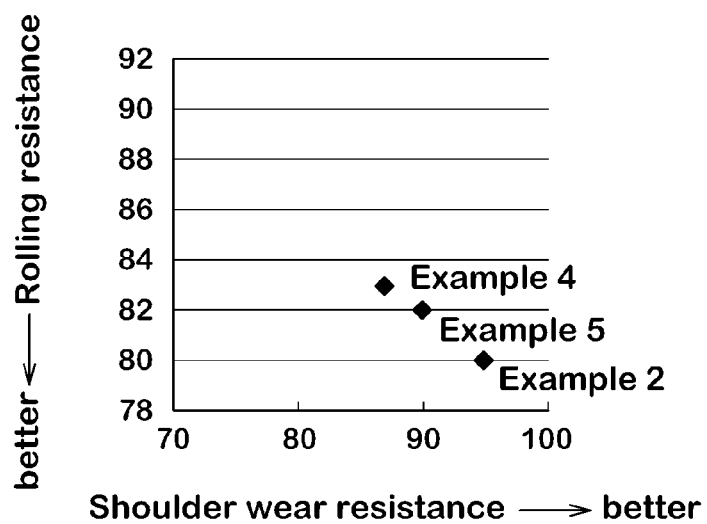
Figure 8C:
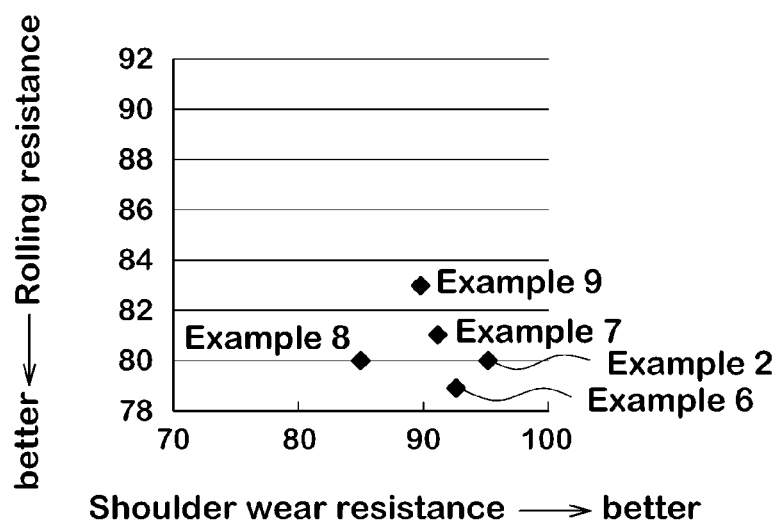

Sample pneumatic tires (165/70R14 81S) with the internal structure shown in FIG. 1 were fabricated according to the specifications listed in Tables 1-1 to 1-3. The sample pneumatic tires were tested for rolling resistance and wear resistance of the shoulder. Other conditions than the specifications listed in Tables 1-1 to 1-3 are approximately the same throughout the sample pneumatic tires. For each tire, t(0)=12.6 mm and Ca(1.0)=46.4 mm. FIGS. 8A to 8C are graphs of rolling resistance and shoulder wear resistance according to examples 1 to 9 and comparative examples 1 to 3.

(1) Rolling Resistance

Under the following conditions, rolling resistance (indicated by the unit N) of each tire was measured using a rolling resistance test instrument. As the value is smaller, the rolling resistance is smaller and more satisfactory.

Temperature: 20° C.
Alignment
   Toe angle: Zero.
   Camber angle: 0.0°
Drum diameter: 1.7 m (drum surface: smooth steel)
Load: 4.0 kN
Internal pressure: 240 kPa
Rim: 14×5J
Speed: 80 km/h
A sufficiently long burn-in period (30 minutes) is set until a steady state is ensured, whereas approximately half this period is set at the time of reversal, since the tire is warm.

(2) Wear Resistance of Shoulder

Under the following conditions, wear energy Ec and wear energy Es were measured using a bench wear energy measurement device. The wear energy Ec is wear energy at a block (center block) on a block row (center block row) closest to the tire's equator surface. The wear energy Es is wear energy at a block (shoulder block) on a block row (shoulder block row) closest to the ground contact edge. The wear resistance of the shoulder is evaluated by indexation of a reciprocal of the wear energy ratio Es/Ec multiplied by 100. For example, when Es/Ec=1.33, the shoulder wearability is (1/1.33)×100=75.

Internal pressure: 240 kPa
Rim: 14×5J
Load: 4.0 kN
Camber angle: 0.0°

TABLE 1-1

| Tread thickness distribution curve f(y) | Comparative example 1 | Example 1 | Example 2 | Example 3 | Comparative example 2 | Comparative example 3 | Example 4 |
|---|---|---|---|---|---|---|---|
| f(0.1) | 0.0000 | 0.0013 | 0.0023 | 0.0030 | 0.0013 | 0.0100 | 0.0023 |
| f(0.2) | 0.0000 | 0.0055 | 0.0102 | 0.0113 | 0.0055 | 0.0200 | 0.0102 |
| f(0.3) | 0.0000 | 0.0150 | 0.0214 | 0.0255 | 0.0130 | 0.0310 | 0.0214 |
| f(0.4) | 0.0000 | 0.0476 | 0.0458 | 0.0453 | 0.0200 | 0.0400 | 0.0458 |
| f(0.5) | 0.0000 | 0.0879 | 0.0712 | 0.0655 | 0.0300 | 0.0500 | 0.0712 |
| f(0.6) | 0.0000 | 0.0990 | 0.0800 | 0.0789 | 0.0430 | 0.0600 | 0.0714 |
| f(0.7) | 0.0321 | 0.1120 | 0.0800 | 0.1039 | 0.0600 | 0.0700 | 0.0565 |
| Difference f(0.7) − f(0.5) | 0.0321 | 0.0240 | 0.0088 | 0.0384 | 0.0300 | 0.0200 | −0.01468 |
| Carcass camber ratio Ca(0.7)/Ca(1.0) | 0.123 | 0.123 | 0.123 | 0.123 | 0.123 | 0.123 | 0.123 |
| Rolling resistance | 90 | 82 | 79 | 82 | 86 | 87 | 80 |
| Wear resistance of shoulder | 75 | 85 | 95 | 88 | 79 | 78 | 87 |

TABLE 1-2

| Tread thickness distribution curve f(y) | Example 10 | Example 5 | Example 6 | Example 7 | Example 8 | Example 10 |
|---|---|---|---|---|---|---|
| f(0.1) | 0.0023 | 0.0023 | 0.0023 | 0.0023 | 0.0023 | 0.0023 |
| f(0.2) | 0.0102 | 0.0102 | 0.0102 | 0.0102 | 0.0102 | 0.0102 |
| f(0.3) | 0.0214 | 0.0214 | 0.0214 | 0.0214 | 0.0214 | 0.0214 |
| f(0.4) | 0.0458 | 0.0458 | 0.0458 | 0.0458 | 0.0458 | 0.0458 |
| f(0.5) | 0.0712 | 0.0712 | 0.0712 | 0.0712 | 0.0712 | 0.0712 |
| f(0.6) | 0.0800 | 0.0900 | 0.0789 | 0.0789 | 0.0789 | 0.0789 |
| f(0.7) | 0.0512 | 0.0960 | 0.0800 | 0.0800 | 0.0800 | 0.0800 |
| Difference f(0.7) − f(0.5) | −0.0200 | 0.0248 | 0.0088 | 0.0088 | 0.0088 | 0.0088 |
| Carcass camber ratio Ca(0.7)/Ca(1.0) | 0.123 | 0.123 | 0.102 | 0.145 | 0.095 | 0.150 |
| Rolling resistance | 83 | 82 | 79 | 81 | 80 | 83 |
| Wear resistance of shoulder | 86 | 85 | 93 | 92 | 85 | 90 |

TABLE 1-3

| Tread thickness distribution curve f(y) | Example 11 | Example 12 | Example 13 | Example 14 | Example 15 | Example 16 |
|---|---|---|---|---|---|---|
| f(0.1) | 0.0023 | 0.0023 | 0.0023 | 0.0023 | 0.0023 | 0.0023 |
| f(0.2) | 0.0071 | 0.0110 | 0.0102 | 0.0102 | 0.0102 | 0.0102 |
| f(0.3) | 0.0100 | 0.0300 | 0.0201 | 0.0214 | 0.0214 | 0.0214 |
| f(0.4) | 0.0458 | 0.0458 | 0.0300 | 0.0600 | 0.0458 | 0.0458 |
| f(0.5) | 0.0712 | 0.0712 | 0.0712 | 0.0721 | 0.0600 | 0.1000 |
| f(0.6) | 0.0800 | 0.0800 | 0.0800 | 0.0800 | 0.0790 | 0.0820 |
| f(0.7) | 0.0800 | 0.0800 | 0.0800 | 0.0800 | 0.0800 | 0.0800 |
| Difference f(0.7) − f(0.5) | 0.0088 | 0.0088 | 0.0088 | 0.0079 | 0.0200 | −0.0250 |
| Carcass camber ratio Ca(0.7)/Ca(1.0) | 0.123 | 0.123 | 0.123 | 0.123 | 0.123 | 0.123 |
| Rolling resistance | 82 | 82 | 80 | 82 | 82 | 82 |
| Wear resistance of shoulder | 80 | 80 | 80 | 80 | 85 | 85 |

Tables 1-1 to 1-3 prove that the tires according to the examples of the embodiment show alleviated rolling resistance and alleviated uneven wear at the shoulder.

Obviously, numerous modifications and variations of the present invention are possible in light of the above teachings. It is therefore to be understood that within the scope of the appended claims, the invention may be practiced otherwise than as specifically described herein

The invention claimed is:

1. A pneumatic tire comprising:
    a tread;
    a sidewall coupled to each axial side of the tread;
    a bead coupled to each sidewall and comprising a bead core; and
    a carcass extending between the bead cores through the tread and the sidewalls,
    wherein
        in a reference state of the tire in which the tire is fitted with a rim deviating from a regular rim only by having a width that is one inch larger than a width of the regular rim, the internal pressure of the tire is 15 kPa, and the tire is loaded with no load,
    a tread thickness distribution curve $f(y)$ represented by the formula $f(y)=1-t(y)/t(0)$ is
        0.01 to 0.03 when $y=0.3$;
        0.03 to 0.06 when $y=0.4$; and
        0.06 to 0.10 when $y=0.5$,
    wherein
        y denotes a ratio of an axial distance from the tire equator plane to an axial distance L between the tire equator plane and a maximum width position of the carcass, and
        $t(y)$ denotes a tread thickness which is a radial distance between the radially outer surface of the carcass and the radially outer surface of the tread at an axial position $P_y$ having the axial distance ratio y,
    wherein
        a difference $(f(0.7)-f(0.5))$ between $f(y)$ when $y=0.5$ and $f(y)$ when $y=0.7$ is in a range of from $-0.02$ to $0.02$.

2. The pneumatic tire according to claim 1, wherein
    given that a carcass camber $Ca(y)$ is defined by a radial distance between the radially outer surface of the carcass at an axial position $P_y$ having the axial distance ratio y and
    a carcass equator point at which the radially outer surface of the carcass is intersected by the tire equator plane,
    a carcass camber $Ca(0.7)$ at an axial position $P_{0.7}$ is in a range of from 0.100 to 0.145 times a carcass camber $Ca(1)$ at an axial position $P_1$.

* * * * *